(12) United States Patent
Aliberti et al.

(10) Patent No.: US 9,427,112 B2
(45) Date of Patent: Aug. 30, 2016

(54) DRINK MIXER BOTTLE AND AGITATOR

(71) Applicant: Headquarters, Inc., Pittsburgh, PA (US)

(72) Inventors: David A. Aliberti, Verona, PA (US); Joshua Lederer, Pittsburgh, PA (US)

(73) Assignee: Headquarters, Inc., Pittsburgh, PA (US)

( * ) Notice: Subject to any disclaimer, the term of this patent is extended or adjusted under 35 U.S.C. 154(b) by 0 days.

(21) Appl. No.: 14/995,277

(22) Filed: Jan. 14, 2016

(65) Prior Publication Data

US 2016/0206154 A1 Jul. 21, 2016

Related U.S. Application Data

(62) Division of application No. 14/184,773, filed on Feb. 20, 2014, now Pat. No. 9,301,648.

(60) Provisional application No. 61/767,775, filed on Feb. 21, 2013.

(51) Int. Cl.
*B01F 13/00* (2006.01)
*A47J 43/27* (2006.01)

(52) U.S. Cl.
CPC ............ *A47J 43/27* (2013.01); *B01F 13/0022* (2013.01)

(58) Field of Classification Search
CPC ...... B01F 7/0045; B01F 7/22; B02F 13/002; A47J 43/27
USPC .................................. 366/270, 317, 342, 343
See application file for complete search history.

(56) References Cited

U.S. PATENT DOCUMENTS

| | | | |
|---|---|---|---|
| 645,112 A * | 3/1900 | Mapes | A63F 9/0415 273/146 |
| 3,892,410 A * | 7/1975 | Hoetzel | A63F 9/04 273/145 C |
| 4,461,210 A | 7/1984 | MacPhee et al. | |
| 4,641,974 A | 2/1987 | Church | |
| 5,236,262 A | 8/1993 | Espey | |
| 5,544,960 A | 8/1996 | Sommovigo et al. | |
| 6,379,032 B1 | 4/2002 | Sorensen | |
| D476,522 S | 7/2003 | Renz | |
| D510,235 S | 10/2005 | Sorensen | |
| 7,441,941 B2 | 10/2008 | Vernon | |
| D626,837 S | 11/2010 | Meyers et al. | |
| D647,366 S | 10/2011 | Enghard | |
| D664,392 S | 7/2012 | England | |
| D677,121 S | 3/2013 | Meyers et al. | |
| D687,259 S | 8/2013 | Hauser et al. | |
| 2014/0233344 A1 | 8/2014 | Aliberti et al. | |
| 2014/0340979 A1 | 11/2014 | Keel, III | |

* cited by examiner

*Primary Examiner* — Tony G Soohoo
*Assistant Examiner* — Anshu Bhatia
(74) *Attorney, Agent, or Firm* — McKay & Associates, PC

(57) ABSTRACT

An agitator is for use in a shaker. The agitator comprises a tetrahedral body having four planar faces, four vertices, and six edges, each edge traveling between each of the vertices. Each vertex is rounded off and configured to forcibly contact the container wall and an entirety of the bottom upon shaking the vessel. These rounded vertices create a propeller-like spinning and tumbling motion through the liquid-powder mixture when the vessel is vigorously shaken up and down, and scalloped edges of the agitator produce additional turbulence to efficiently blend a liquid/powder mixture.

6 Claims, 3 Drawing Sheets

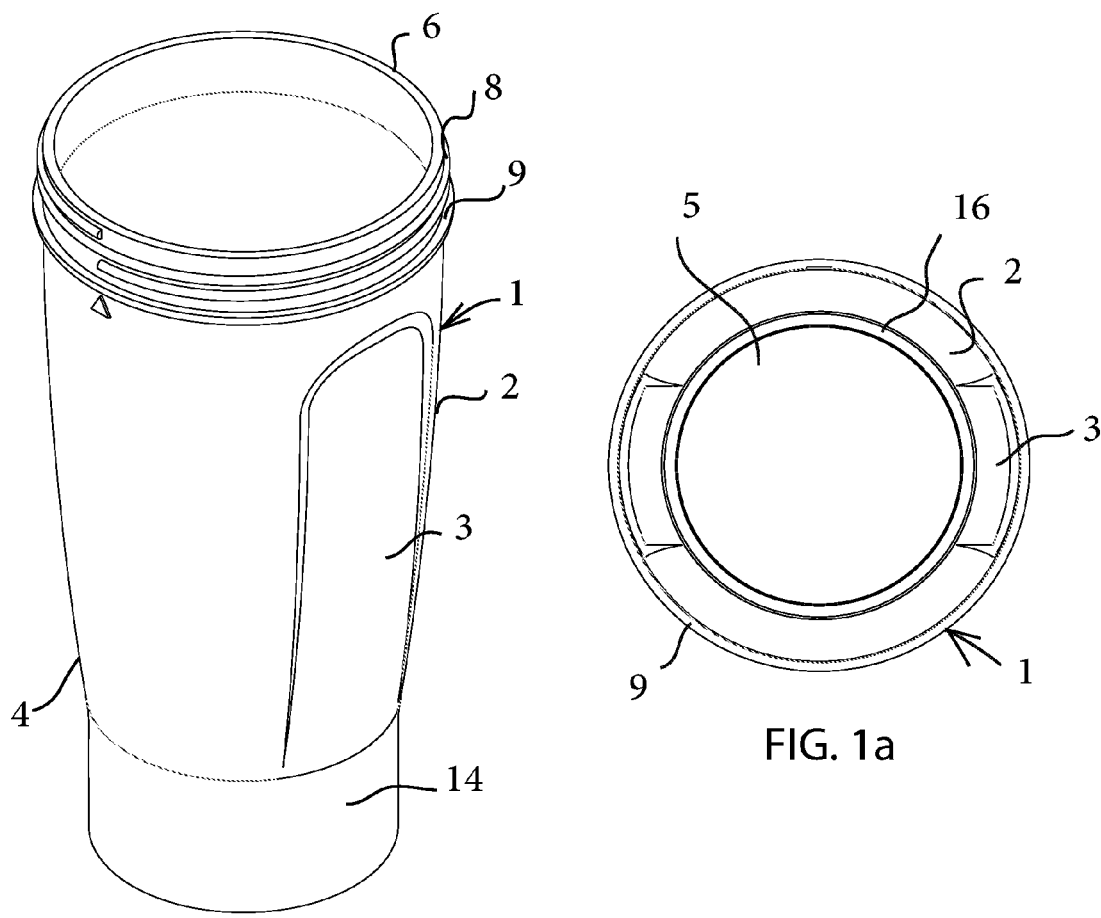
FIG. 1
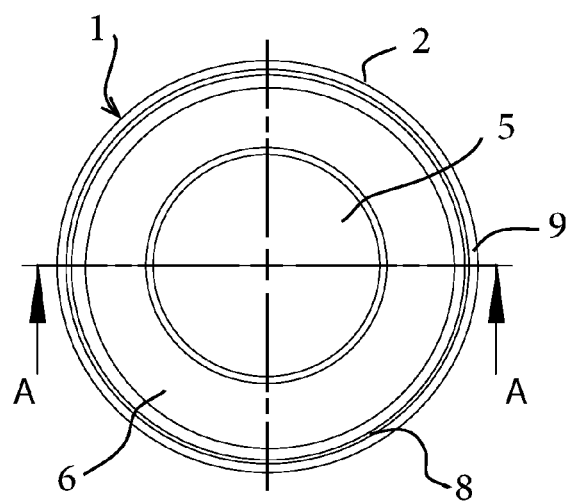
FIG. 1a
FIG. 2

DRINK MIXER BOTTLE AND AGITATOR

CROSS-REFERENCE TO RELATED APPLICATIONS

The instant application is a divisional application of application Ser. No. 14/184,773, filed Feb. 20, 2014, now U.S. Pat. No. 9,301,648, which claimed benefit of provisional application Ser. No. 61/767,775, filed Feb. 21, 2013, the contents of both which are incorporated herein by reference.

BACKGROUND

Drinking vessels with independent agitators have been designed for mixing powdered solids, such as protein powders or diet supplements, with liquids. Typically, these designs and methods are used in the preparation of consumable liquids formulated to support health or enhance athletic performance The powders/solids are typically placed inside the bottle or other drinking vessel with a liquid (often milk, water, or other consumable substance) and the bottle or other vessel is shaken. The agitator assists in evenly dispersing and blending the solid particles with the liquid.

However, because many agitators are insufficiently massive and/or sub-optimally shaped, the powdered solids will clump, float on the surface, adhere to the walls, or remain on the bottom of the vessel instead of being dispersed and evenly blended. The mass of the agitator is often not adequate to allow it to travel effectively through the liquid solution/suspension to produce a homogenous blending of the powder—a desired property of powder-containing drinking vessels as opposed to aerosol cans which may only require small agitators mixing liquids and only small particulates. Agitators currently used for mixing consumable liquids are often formed of bent wire or molded plastic and have surfaces that can retain particles and powder clumps and can be difficult to clean. For example, U.S. Pat. No. 6,379,032 shows a wire-frame, flow-through agitator. See also U.S. D664,392 teaching a mixing element of the wire-type, formed conically. In some cases, the agitator element is integrated into the bottle design and thus further complicates cleaning. See U.S. Pat. No. 7,441,941 describing a shaker with attached, reciprocating agitator.

Additionally, the irregular forms of current agitators often prevent them from being placed easily on a surface for cleaning/drying, as a result rolling across or falling off of a table or the cleaning surface. Current methods for mixing consumable liquids, moreover, do not feature vessels whose specific interior surface features work with the agitator in a complementary fashion to blend the liquid and powder. As a result, the interaction of the agitator, liquid-powder mix and the inner surfaces of the drinking vessel is not optimized for producing a homogeneous mixture. In addition, the interior surfaces of current drinking vessels are often difficult to clean, particularly the bottom edge between the inner base plane and the walls, due to the creation of a small surface by the sharp angle here where debris can be lodged or trapped.

There is a need then for a combination agitator and drinking vessel that adequately blends powdered consumables using optimally sized and shaped components as further described.

SUMMARY

It is an objective of the instant invention to provide a combination agitator and drinking vessel which mixes a powder with a liquid to form a homogeneous consumable.

It is further an objective to provide the combination agitator and drinking vessel which mixes the powder with the liquid to form the consumable quickly.

It is further an objective to provide the combination agitator and drinking vessel which mixes the powder with the liquid to a high degree of dissolution.

It is further an objective to provide the combination agitator and drinking vessel which is easy to clean.

It is further an objective to provide an optimally shaped agitator for accomplishing the above.

It is further an objective to provide an optimally-shaped drinking vessel for accomplishing the above.

Accordingly, comprehended is a shaker including a vessel and an agitator. The vessel includes a container wall. A rounded bottom closes off the container wall, wherein a border of the bottom is formed radially towards a center axis of the vessel such that the bottom transitions from the container wall to be outwardly domed. An agitator is for use in combination with the vessel, the agitator further comprising a tetrahedral body having four planar faces, four vertices, and six edges, each edge traveling between each of the vertices. Each vertex is rounded off and configured to forcibly contact the container wall and an entirety of the bottom upon shaking the vessel.

The vessel includes an outer sleeve connected around the bottom extending from a lower portion and encircling the bottom at an acute angle with the border of the bottom to extend downward from the lower portion and extend past the rounded bottom such that said vessel can be situated upright on a surface.

The agitator is regularly symmetrical and includes rounded off edges and vertices to create swirling effects within the liquid.

BRIEF DESCRIPTION OF THE DRAWINGS

FIG. 1 shows a perspective view of the instant drinking vessel.

FIG. 1a shows a bottom view of the instant drinking vessel.

FIG. 2 shows a top view of the drinking vessel.

DETAILED DESCRIPTION OF THE PREFERRED EMBODIMENT

With reference then to FIGS. 1-7, shown is a vessel 1, agitator 17, and the combination thereof defined as a shaker (see FIG. 7) adapted to blend a liquid such as water with a consumable powder such as a protein powder by hand-shaking. The drinking vessel 1 may vary in size, proportion, and material. Although not limited hereto, one example is a vessel 1 being twenty-eight (28) ounces, 8.75 inches in height and 3.75 inches wide at its widest point. Vessel 1 is typically made of a semi-rigid composite such as plastic. Agitator 17 herein is preferably made of a similar material such as food-grade plastic and can also be made of a dense and solid food-grade silicone or the combination thereof being a silicone-coated plastic. In one embodiment, the agitator 17 is semi-hollow and can contain a water or liquid-filled plastic part that would allow the user to freeze it and use it as a cooling element for within the vessel 1.

Figure 3:
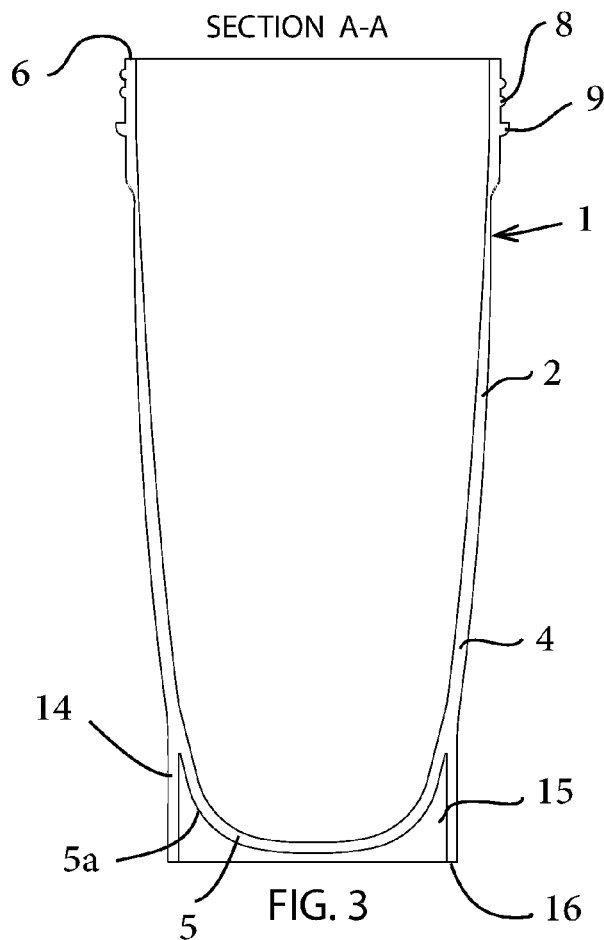
FIG. 3 is a cross-sectional view of section A-A of FIG. 2.
Figure 4:
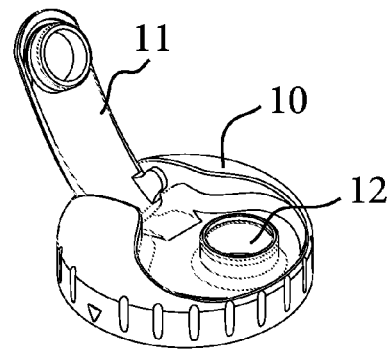
FIG. 4 shows a perspective view of an embodiment of a lid.

Shown by FIGS. 1-4 is the vessel 1 including lid 11. Vessel 1 includes a container wall 2. Although the shape of the container wall 2 may vary and thus the shape of the vessel 1, shown here as the preferred embodiment is a generally cylindrical container wall 2. Grip recesses 3 are indentations defined along the container wall 2 which are utilized to facilitate grasping and shaking of the vessel 1. A top 6 is integral to the container wall 2 and open to an interior of the vessel 1. A threaded portion 8 including threads can facilitate the attachment of any standard screw-on lid 10 with cap 11 and opening 12 as shown by FIG. 4 to allow for the release of the liquid as is known in the art. A flange 9 is formed below the threaded portion encircling the top 6, extending from the container wall 2 on which cap 11 can seat.

In conformance with the preferred shape of container wall 2, a lower portion 4 tapers downward from the container wall 2 such that the diameter at the lower portion 4 would be less than the diameter of the container wall 2 closer to the top 6. In this manner, lower portion 4 can be accommodated within variably sized cup holders of a vehicle for example. Lower portion 4 also facilitates the attachment of an outer sleeve 14, as further described.

With continued reference to FIGS. 1-4 and particularly FIG. 3, vessel's lower portion 4 and thus container wall 2 is closed off with bottom 5. The bottom 5 is round, defined by a border 5a which is formed radially towards a center axis (not shown) of the vessel 1 (vertical axis through interior) such that the bottom 5 is rounded outward, or outwardly domed, meaning if lower portion 4 terminates at the base plane, defined as where bottom 5 begins, the bottom 5 extends away from the base plane rather than upward back into the interior of vessel 1.

Encircling outside bottom 5 and connected to the lower portion 4 and thus at base plane is the outer sleeve 14. Outer sleeve 14 is a cylindrical ring extending integrally from lower portion 4, slightly outward away from center axis such that an acute angle is formed with the border 5a of bottom 5 to form a pocket 15, again resulting from the dome-like shape of bottom 5. Outer sleeve 14 provides stability to vessel 1 for storage within receptacles. A flat rim 16 is defined at the edge of outer sleeve 14 to facilitate upright stability on surfaces.

Figure 5:
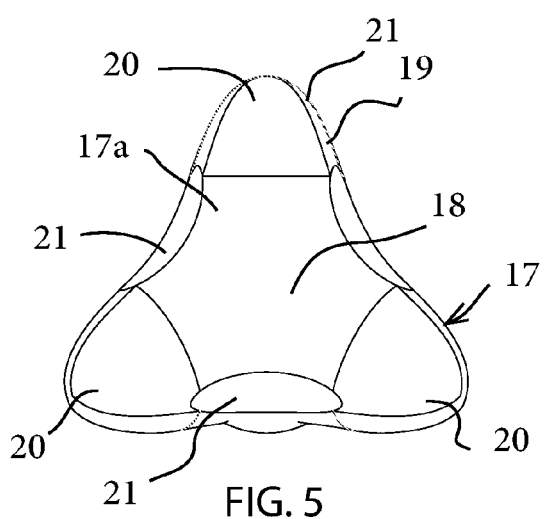
FIG. 5 shows a perspective view of the instant agitator.
Figure 6:
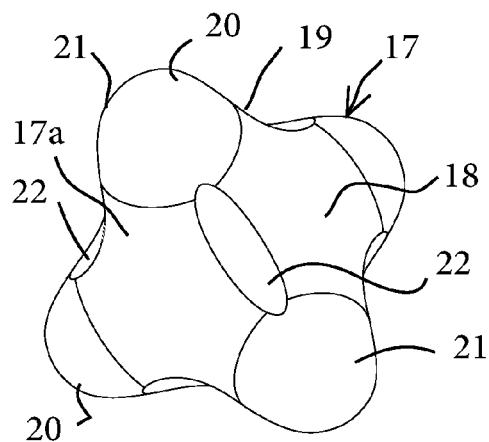
FIG. 6 shows an additional perspective view of the agitator.

Now referencing FIGS. 5-6, shown is the instant agitator 17. The agitator 17 is a polyhedral-shaped, preferably solid mass. More particularly the agitator 17 is a generally tetrahedral body 17a having four planar faces 18, four vertices 20, and six edges 19. The shape of agitator 17 is critical. "Generally" tetrahedral means the agitator 17 is regularly symmetrical and similar to a triangular pyramid but for having scalloped edges 19 and additionally having rounded-off vertices 20 instead of points as shown. Specifically, each edge 19 is scalloped and curves slightly inward toward the geometric center of the body 17a. "Scalloped" means the edge 19 is not formed as a linear edge, rather edge 19 is slightly rounded off. Each vertex 20 is uniformly rounded off to transition radially and smoothly into each edge 19. Scalloped edge 19 and rounded vertices 20, by their elimination of sharp features, slows agitator 17 down within a liquid matrix. Whereas sharp features would cut through a liquid, the instant edges 19 and vertices 20 aid in churning the liquid.

Each vertex 20 is formed having a radius which is complementary to radius of the border 5a of rounded bottom 5 of vessel 1 (FIG. 3). Edge 19 is defined by both a transition portion 21 and a medial portion 22. Transition portion 21 is the finished area on edge 19 extending from vertex 20. Each transition portion 21 terminates at the medial portion 22. Medial portion 22 is defined along the edge medially along each edge sandwiched by each transition portion 21. Medial portion 22 is flattened slightly to define an oval-like cut-out as shown. If agitator 17 were entirely smooth with no un-scalloped edges, agitator 17 could travel through the liquid matrix too fast, hence the definition of the medial portion 22 where each transition portion 21 terminates. Medial portion 22 therefore, by its inclusion of a linearly-edged perimeter, creates more chaos to break up the flow of the liquid but not so much turbulence that it offsets the speed of the agitator 17 generated by the scalloped edges 19 and vertices 20.

Figure 7:
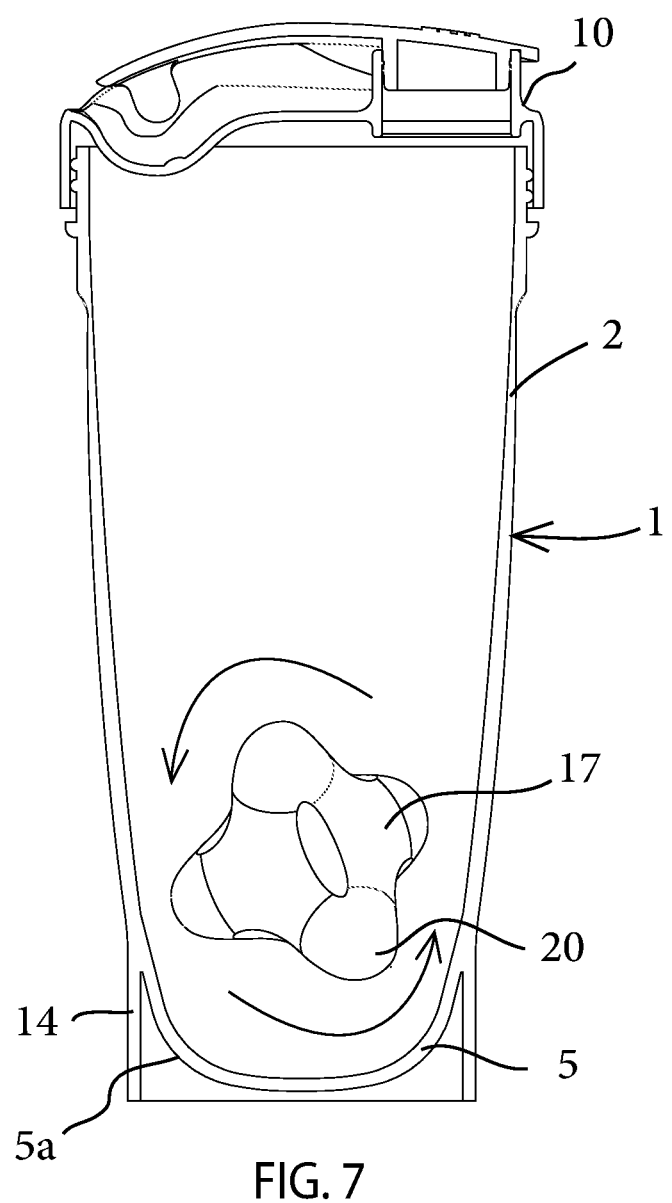
FIG. 7 shows a side view and diagrammatic illustration of the agitator within the drinking vessel and spinning therein.

Referencing now FIG. 7, shown is the combination of the vessel 1 having therein the agitator 17, the combination of which is defined herein as shaker. The present invention relates to an improved system and method featuring the drinking vessel-agitator for uniform blending of liquid/powder mixtures. During shaking, the agitator 17 will continuously and randomly collide with the container wall 2 and bottom 5. The shape of the agitator 17 and drinking vessel 1 are central to the effectiveness of the system and method. The agitator 17, which is unattached to the vessel 1, may be of variable proportion and material as above, including any material that will withstand repeated collisions with the vessel walls, but it should be large enough that it does not present a choking hazard, and its form must consist of rounded projections with scalloped edges. Its mass must also be sufficient for these rounded projections to create a propeller-like spinning and tumbling motion through the liquid-powder mixture when the vessel 1 is vigorously shaken up and down. The agitator's spinning motion disperses any powder or other solid particles contained in the vessel through its liquid contents in an optimally uniform fashion because the circular base plane promotes swirling of the liquid, and the curved slope (border 5a) between the base plane and the walls allows the agitator to make contact with the powder at the bottom of the vessel. The rounded bottom 5 then allows the agitator 17 to efficiently "back up" as the shaking process continues to result in multiple, rhythmic collisions. The result of the interaction between a thusly-shaped agitator, thusly-shaped vessel, and liquid/powder mixture, when the vessel is shaken, is an optimally consistent liquid/powder mixture.

We claim:

1. An agitator, comprising:
   a generally tetrahedral body having four planar faces, four vertices, and six edges, each said edge traveling between each of said vertices; and,
   wherein each said edge is scalloped and curves inward toward a geometric center of said body; and,
   each said vertex is rounded off, and each said vertex transitions into each of said edges and each of said planar faces to define a transition portion between each of said edges.

2. The agitator of claim 1, further comprising a medial portion defined along each said edge defined medially along each said edge, said medial portion flattened to define an oval-like cut-out along each said edge.

3. The agitator of claim 1, wherein said tetrahedral body is a solid mass.

4. The agitator of claim 3, wherein said tetrahedral body is food-grade silicon.

5. The agitator of claim 1, wherein said tetrahedral body is food-grade plastic.

6. The agitator of claim 1, wherein said tetrahedral body is partially hollow such that said tetrahedral body can be water or liquid-filled.

\* \* \* \* \*